(No Model.) 2 Sheets—Sheet 1.
C. MENDENHALL.
CULTIVATOR.
No. 394,283. Patented Dec. 11, 1888.
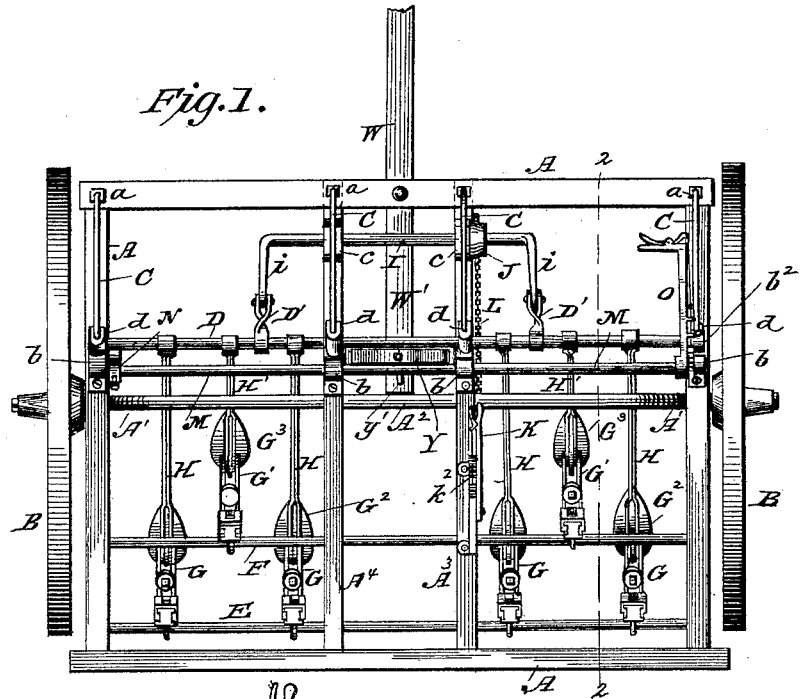
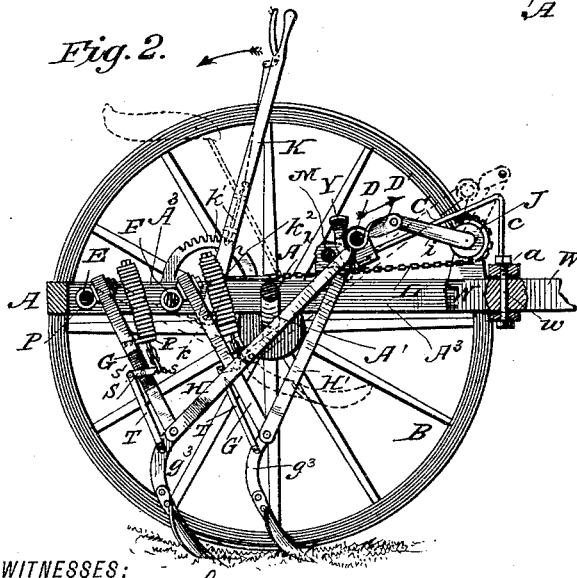
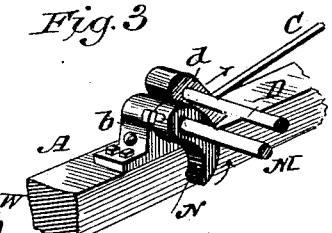
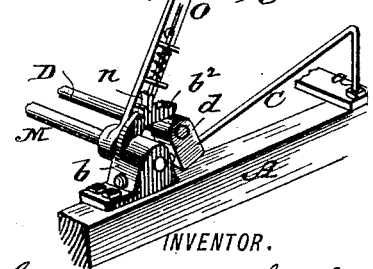
WITNESSES:
Fred G. Dieterich
Joeon C. Kemon
INVENTOR.
C. Mendenhall,
BY Munn & Co
ATTORNEY.

(No Model.) 2 Sheets—Sheet 2.
C. MENDENHALL.
CULTIVATOR.
No. 394,283. Patented Dec. 11, 1888.
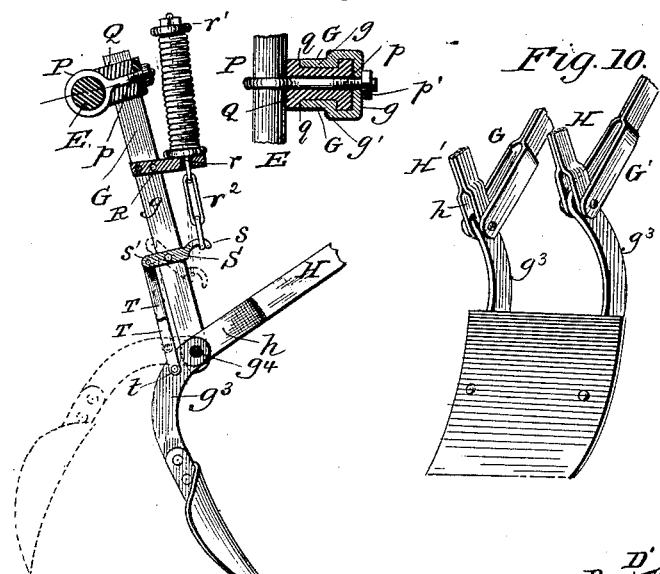

UNITED STATES PATENT OFFICE.

CLINTON MENDENHALL, OF MARTINSBURG, WEST VIRGINIA.

CULTIVATOR.

SPECIFICATION forming part of Letters Patent No. 394,283, dated December 11, 1888.

Application filed July 3, 1888. Serial No. 278,945. (No model.)

*To all whom it may concern:*

Be it known that I, CLINTON MENDENHALL, of Martinsburg, in the county of Berkeley and State of West Virginia, have invented a new and useful Improvement in Cultivators, of which the following is a specification.

The object of my invention is to provide a cultivator which shall be adapted for cultivating different kinds of grain and for use upon stony or stumpy ground.

My invention consists in a wheeled frame having a series of inclines at its forward end, a shaft supported upon and adapted to travel upon said inclines, said shaft having the plows connected thereto, a lever for operating the shaft, by means of which the plows may be lifted out of the ground, and means for regulating the depth of the plows.

It further consists in the peculiar construction and combination of parts, as will be hereinafter fully explained, and particularly pointed out in the claims.

In the accompanying drawings, Figure 1 represents a plan view of my improved cultivator. Fig. 2 is a vertical section on the line 2 2, Fig. 1. Figs. 3 and 4 are detail views, which will hereinafter be referred to. Fig. 5 is a sectional elevation illustrating the construction and operation of the spring-shovel. Fig. 6 is a detail view of one of the shovel-connections to its supporting-shaft. Fig. 7 is a detail view, hereinafter referred to. Figs. 8 and 9 are detail views illustrating the foot-lever and oscillating tongue, and Figs. 10 and 11 are detail views of modified forms of shovels.

In the construction of my improved cultivator I employ a rectangular or square frame, A, supported upon the axle A′ and supporting wheels B B. To permit of the more ready manipulation of the shovels and drag-bars, (the construction of which will be presently explained,) I prefer to form the axle A′ with the arched portion A², as shown.

Upon the front end of the machine is arranged a series of inclined bars, C C, the front ends of which are bent downwardly, as at $c\ c$, and are secured in the frame, as at $a$, while the rear ends of the bars C are secured in bearing-blocks $b\ b$, as shown. Upon these inclined bars is supported, and arranged to slide thereon, a transverse shaft, D.

To secure a perfect operation of the shaft D, it is connected to the bars C by means of a sliding block, $d\ d$, in which the outer ends of the shaft are journaled. In the rear part of the frame A are journaled two cross-shafts, E F, to which are connected the plow-hangers G G′. The peculiar connection of such hangers G G′ will be explained farther on.

Supported in the hangers G G are the plows $G^2$ and $G^3$. H H′ denote the drag-bars, which are connected at their lower ends to the plows $G^2\ G^3$ and hangers G G′, while their forward ends are connected to the transverse shaft D. Thus it will be seen that by moving the shaft D up on the inclines C the plows will be drawn forward out of the ground, to enable them to pass obstructions, or where it is desired to transport the machine.

In suitable bearings, $c\ c$, upon the frame A, I journal a rock-shaft, I, provided with crank-arms $i\ i$, the outer ends of which are pivotally connected to forward-projecting arms or ears D′, secured to the shaft D.

J denotes a hub fixed near the center of the shaft I.

K represents a hand-lever pivoted at its lower end in the frame A, as at $k$, near the driver's seat, and is provided with the usual rack and spring-pawl, $k'$, as shown. To this lever, as at $k^2$, is connected one end of a chain, L, the other end of which is connected to the hub J, as at $j$.

From the foregoing it will readily appear that when the lever K is pulled backward, as shown in Fig. 7, the chain L will turn the hub J and shaft I and throw the crank-arms $i\ i$ forward, which, being connected to the shaft D, will draw the same up the inclines and thereby raise the shovels out of the ground; but when the lever is released from its connection with the ratchet $K^2$ the weight of the plows will draw the shaft D down the inclines and throw the crank-arms $i\ i$ backward, the lever K forward, wind up the slack chain upon the hub, and lower the plows to engagement with the ground. When said plows are lowered to operate, it is desirable to adjust them to various depths for plowing. To this end I provide a transverse shaft, M, mounted to rock in bearings e e on the frame of the machine. Upon this shaft I mount one or more cam projections, N.

By reference to Figs. 3 and 4 of the drawings the construction of the projection and shaft M will be readily understood.

Upon one end of the shaft M, I arrange a hand-lever, O, provided with a spring-pawl adapted to engage with a segmental rack, $b^2$, on one end of the bearing $b$. By turning the lever any desired degree in the direction of the arrow the cam N will turn against the shaft D and tend to force the same up the incline C. Thus it will be seen that when the cam N is turned down, as shown in Fig. 3, the shaft D will be at its lowest point and the plows will have been lowered to their greatest depth. This depth may be readily decreased by turning the shaft and cam N and forcing the shaft D up to the desired extent, and the cam will be held in such position by the pawl $n$ upon the hand-lever O engaging the segmental rack $b^2$, as shown.

By reference to Figs. 5 and 6 of the drawings the peculiar connection and construction of my spring-plows $G^2$ and $G^3$ and hanger G will be the more readily understood.

As the connections of all of the plows to the cross-shafts D, E, and F are similar, I shall only describe one of them.

Upon the shaft E is securely fastened an eyebolt, P, the stem $p$ of which passes through clip-block Q. This block is provided with a groove, $q$ $q$, in each side, in which is fitted the hanger G. This hanger consists of two parallel bars, $g$ $g$, connected near their upper ends by the cross-plate $g'$. This cross-piece fits across the front face of the block Q, and has passed through it the stem $p$ of the eyebolt P, to which is applied the nut $p'$, thereby securely fastening the upper end of the hanger G to the shaft E. Pivoted in the lower end of the hanger G is the forked end $h$ of the drag-bar H, which has fitted between its forked end $h$ the upper end of the shovel-arm $g^3$, the said shovel-arm and drag-bar H being pivotally connected to the hangers G by the pivot-bolt $g^4$. Pivoted in the hanger G is a cross-block, S, which has its forward end formed into a projecting finger, $s$, and its rear end extended, as at $S'$. T T are two pendent bars, which are pivoted at their upper ends to the projection $S'$ and at the lower ends to the plow-arm, as at $t$, just in the rear of its connection to the hanger. Upon a base-plate, R, secured to the hangers, is supported a coiled spring, with the usual projecting central rod, $r$, and cap-plate $r'$, the lower end of which rod $r$ is connected to the finger $s$ by means of the link $r^2$. The arrangement of this spring with the shovel forms an important feature of this invention. When the plow is down ready for use, as shown in Fig. 5, the end of the link $r^2$ will rest near the outer end of the finger $s'$. Now, when the plow meets an obstruction the same will come into a position about as is shown in dotted lines, Fig. 5, which will raise the rear end of the pivoted block S and throw its forward end down and exert a considerable tension upon the spring R. During this movement the link $r^2$ will leave the front end of the finger $s$ and be near the base of such finger, as shown in dotted lines, thereby relieving the outer portion of such finger from too severe a strain. When the plow shall have passed the obstruction, the spring and the arms T and block S will pull same back again to its operative position. When the plows are raised by means of the lever K, the spring will pull the plows up under the frame, as shown in dotted lines, Fig. 2.

To permit for the ready guiding of the cultivator along the side of a hill, or for cultivating crooked rows of corn, it is provided with an oscillating tongue, W, which is pivoted at $w$ to the frame and has its end W' extending a short distance rearward between the longitudinal beams $A^3$ $A^4$ of the frame A. A casting, X, extends over the rear end of the tongue and is secured at each end to the beams $A^3$ $A^4$, as seen in Figs. 8 and 9. This casting is provided with a central hollow hub, as at $x$. Y indicates a foot-lever which has a downwardly-extending stem $y$ passing through the hub $x$, and provided at its lower end with a crank-arm, $y'$, having its downwardly-extending arm $y^2$ entered into the rear end of the tongue W. Thus it will be seen that when the driver desires to point the tongue to either side it is only necessary to operate upon either end of the foot-lever to swing the rear end of the tongue. The operation of this construction will be readily understood by references to Figs. 8 and 9 of the drawings.

The plows are so arranged that those in the rear shall pass between the furrows made by the front ones, whereby the soil may be completely broken, &c.

In Figs. 10 and 11 I have shown a peculiar form of shovel. These shovels are formed of a nearly square piece of metal and bent diagonally, in order that they may be used reversibly. In their practical application they are secured to two of the plow-supports, as shown in Fig. 10.

From the foregoing description, taken in connection with the drawings, the operation and advantages of my improved cultivator will be readily understood.

Having thus described my invention, what I claim is—

1. In a cultivator, the combination, with the frame A, the inclined bars C, mounted upon the forward end of said frame, and the transverse shaft D, said shaft connected with the forward ends of the drag-bars H of the plows, of the rock-shaft I, journaled in the forward end of the frame, provided with rearwardly-extending crank-arms $i$, connected to the shaft D, and the lever mechanism, substantially as described, for operating the shaft I, whereby the shaft D is caused to travel up the inclined bars C, as and for the purpose described.

2. The combination, with the inclined arms C, supported on the frame, the cross-shaft D, adapted to travel upon said arms C, of the transverse rock-shaft M, provided with cam projections N, and a lever, O, for rocking said shaft, said lever provided with a pawl, N, engaging a rack, $b^2$, said lever and cam adapted to impart a limited movement upon the shaft D, substantially as and for the purposes specified.

3. In a cultivator, the combination of the frame A, provided with inclined bars C at its forward end, of the sliding blocks $d$, mounted on said bars C, said sliding boxes having journaled therein the ends of the shaft D, and means, substantially as shown and described, for moving said bars and shaft up the incline, substantially as and for the purposes specified.

4. The combination, with the frame A, the inclines C, and cross-shaft D, having projecting arms or ears D', of the transverse shaft I, mounted in bearings upon the frame A, having crank-arms $i$ pivoted to the ears D', and provided with a hub, J, the lever K, pivoted to the frame A at K, a chain, L, one end of which is secured to the hub J and the opposite end to the lever K, and the rack-and-pawl mechanism K' for holding said lever in the desired position, all arranged substantially as and for the purposes specified.

5. The combination of the shaft E, the eye-bolt P, the block Q, said block provided with grooves $g$ $g$, the plow hanger or supports G, fitted in said grooves, and provided with an apertured cross-plate, $g'$, fitted upon the outer face of the block Q, the said eyebolt passing through the block and cross-plate $g$ and fitted with a nut at its outer end, whereby the block and hangers are secured to the shaft, substantially as and for the purpose described.

6. The combination, with the drag-bars H, connected to the shaft D, and the hangers G, supported by the shaft E, said hanger consisting of the parallel arms G' G', a pivotal block secured between said arms, a spring supported by the hanger G, said spring connected to the forward portion of the pivot-block S, and the pendent arms T T, the upper ends of which are connected to the rear end of the block S and their lower ends connected to the plow-arms in rear of their pivotal point, all arranged substantially as and for the purpose described.

CLINTON MENDENHALL.

Witnesses:
C. C. MOORE,
C. H. QUENZEL.